(12) United States Patent
Williamson et al.

(10) Patent No.: US 11,539,172 B2
(45) Date of Patent: Dec. 27, 2022

(54) REVEAL PORTS

(71) Applicant: Hewlett-Packard Development Company, L.P., Spring, TX (US)

(72) Inventors: Alan Reid Williamson, Boise, ID (US); Clinton Troy Jensen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

(21) Appl. No.: 17/257,037

(22) PCT Filed: Sep. 25, 2018

(86) PCT No.: PCT/US2018/052688
§ 371 (c)(1),
(2) Date: Dec. 30, 2020

(87) PCT Pub. No.: WO2020/068055
PCT Pub. Date: Apr. 2, 2020

(65) Prior Publication Data
US 2021/0242634 A1    Aug. 5, 2021

(51) Int. Cl.
*H01R 13/6594* (2011.01)
*H01R 13/447* (2006.01)
*H01R 13/60* (2006.01)
*H01R 35/04* (2006.01)
*G06F 1/18* (2006.01)
*H01R 13/44* (2006.01)
*G06F 1/16* (2006.01)

(52) U.S. Cl.
CPC ....... *H01R 13/6594* (2013.01); *H01R 13/447* (2013.01); *H01R 13/60* (2013.01); *H01R 35/04* (2013.01); *G06F 1/1656* (2013.01); *G06F 1/181* (2013.01); *G06F 1/182* (2013.01); *H01R 13/44* (2013.01)

(58) Field of Classification Search
CPC .. H01R 13/6594; H01R 13/447; H01R 13/60; H01R 35/04; H01R 13/44; G06F 1/1633; G06F 1/1656; G06F 1/181; G06F 1/182
See application file for complete search history.

(56) References Cited

U.S. PATENT DOCUMENTS 7,857,659 B2   12/2010   Wang et al.
8,274,786 B2    9/2012   Sapper et al.
8,337,222 B2   12/2012   Hung et al.
(Continued)

FOREIGN PATENT DOCUMENTS

CN   201438593 U   4/2010
CN   202976073 U   6/2013
(Continued)

*Primary Examiner* — Abdullah A Riyami
*Assistant Examiner* — Justin M Kratt
(74) *Attorney, Agent, or Firm* — Brooks, Cameron & Huebsch, PLLC

(57) ABSTRACT

In an example, an apparatus includes a body moveable relative to a housing, a port coupled to the body, and a guide member to guide the body between positions to reveal the port. In another example, an electronics device includes a port area defined by a housing, a cover to cover the port area in a first orientation, a guide to allow the cover to rotate to a second orientation to reveal the port area, and a positioner member to bias the cover into the first orientation or the second orientation.

14 Claims, 11 Drawing Sheets

(56) References Cited

U.S. PATENT DOCUMENTS

| | | |
|---|---|---|
| 9,356,408 B1 | 5/2016 | Biddle et al. |
| 9,960,539 B2 | 5/2018 | Tymus |
| 2007/0077797 A1 | 4/2007 | Reid et al. |
| 2009/0176391 A1 | 7/2009 | Brock et al. |
| 2010/0178797 A1 | 7/2010 | Byrne |
| 2013/0244475 A1 | 9/2013 | Sayadi et al. |
| 2017/0070017 A1* | 3/2017 | O'Connell ........... H01R 13/743 |
| 2018/0131119 A1 | 5/2018 | Makwinski |

FOREIGN PATENT DOCUMENTS

| | | |
|---|---|---|
| CN | 204793383 U | 11/2015 |
| WO | WO-2017039934 A1 | 3/2017 |

\* cited by examiner

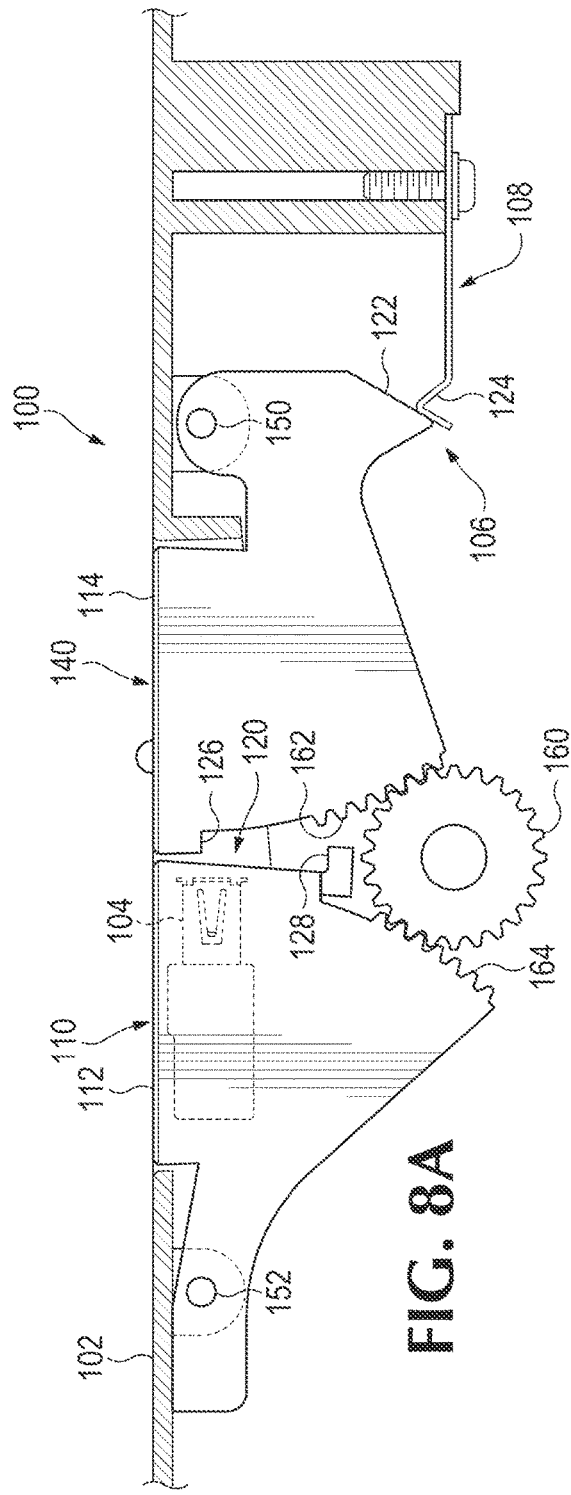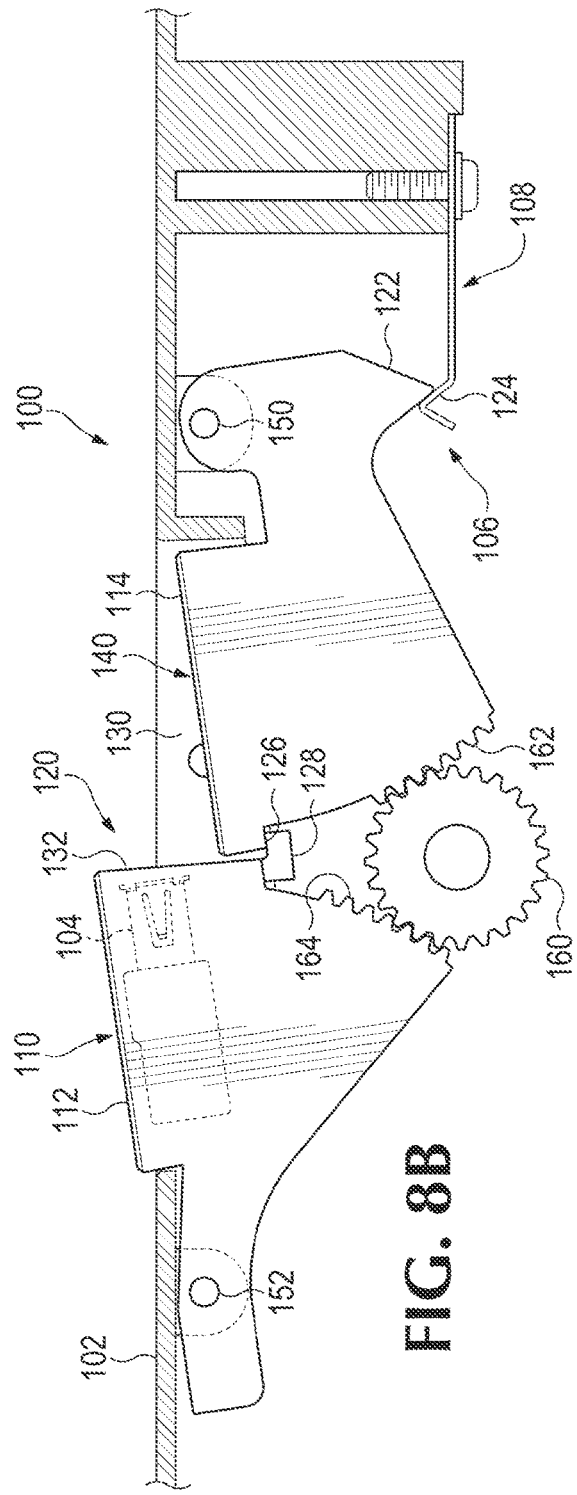

REVEAL PORTS

BACKGROUND

Peripherals are commonly used with computers. For example, a desktop computer device may utilize a number of human interface devices, such as a mouse, a keyboard, a camera, a printer, headphones, and the like. Some connectable peripherals, when not in use, may be stored on the same surface of the computer device, on a separate surface (such as a shelf), or in a container (such as a drawer).

BRIEF DESCRIPTION OF THE DRAWINGS

FIG. 8A is a sectional view of an example apparatus in an example concealed orientation.

FIG. 8B is a sectional view of the example apparatus of FIG. 8A in an example exposed orientation.

DETAILED DESCRIPTION

Figure 1:
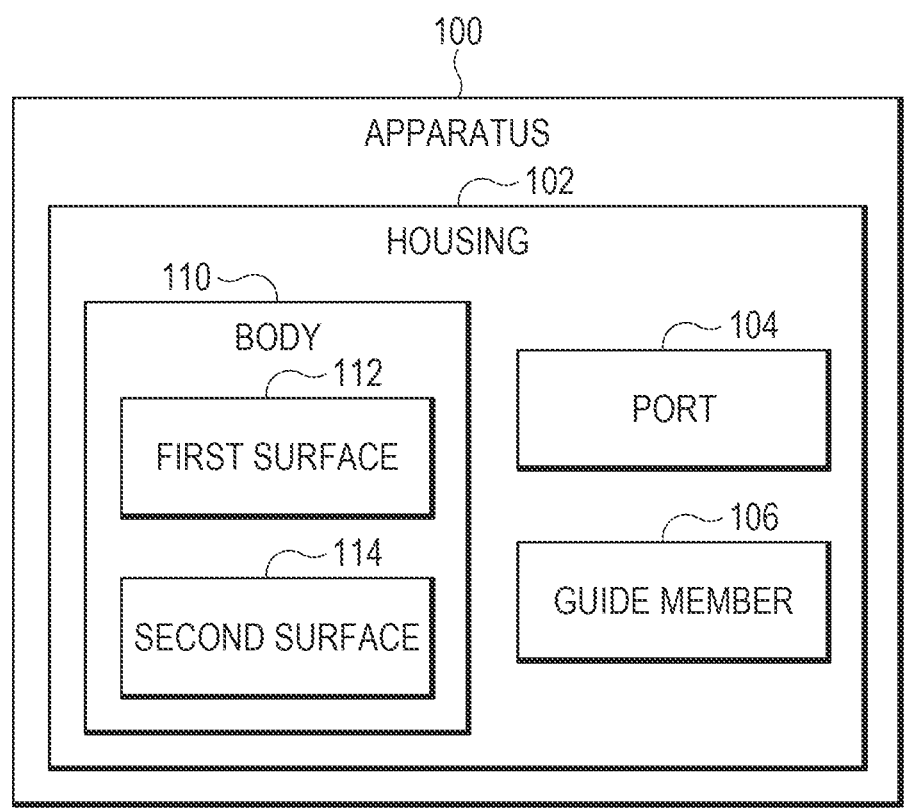
FIGS. 1-3 are block diagrams depicting example apparatus.

In the following description and figures, some example implementations of apparatus and electronic devices are described. Electronic devices, as discussed herein, include computer systems, print apparatus, and other apparatus having electronics. A computer system may be a device having a memory resource, a processor resource capable of executing instructions, and a bus to transmit data.

The computer systems discussed herein include an input/output port (I/O port) to couple to the bus to allow a peripheral to connect to the computer system. Computer systems, such as laptops, desktops, or all-in-one computer systems, may include ports to attach peripherals which allow for providing additional computing features or for enhancing the user experience of the computer system. An example I/O port is a universal serial bus (USB) port that is able to couple a USB flash drive to a computer system.

As used herein, a print apparatus may be a device to print content on a physical medium (e.g., paper, textiles, a layer of powder-based build material, etc.) with a print material (e.g., ink or toner). In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, the print consumables are ejectable from a print head, such as a piezoelectric print head or a thermal inkjet print head. Examples of print fluid may include dye-based color inks, pigment-based inks, water-based latex ink, solvents, gloss enhancers, fixer agents, and the like. The print apparatus discussed herein includes an I/O port to couple to a peripheral.

I/O ports are generally exposed on a surface of the electronic device for accessibility. Such I/O ports may be located near each other based on configuration of a circuit board on which the I/O ports are attached. Due to the exposure of the I/O ports, some ports may become encumbered by the environment (such as dirt or dust) or damaged. In some example, peripherals that connect to the USB ports increase the footprint of the form factor due to bulky connections. In some examples, I/O ports may go unused for an extended amount of time. In those examples, a user may find the exposed ports as visually undesirable.

Various examples described below relate to revealing a concealed port. For example, a surface of an electronic device may include a toggle that, when pressed, rotates a cover to expose a port. A portion of the cover may rotate to withdraw into the housing and a portion of the cover may rotate to expose a port coupled to the cover. By coupling the port to a moveable body member, the port may be concealed when not in use and revealed for use as desired by the user. In the example of a rotatable body member, the port may be exposed at an angle to, as an example, reduce space requirements for connecting peripherals.

Figure 2:
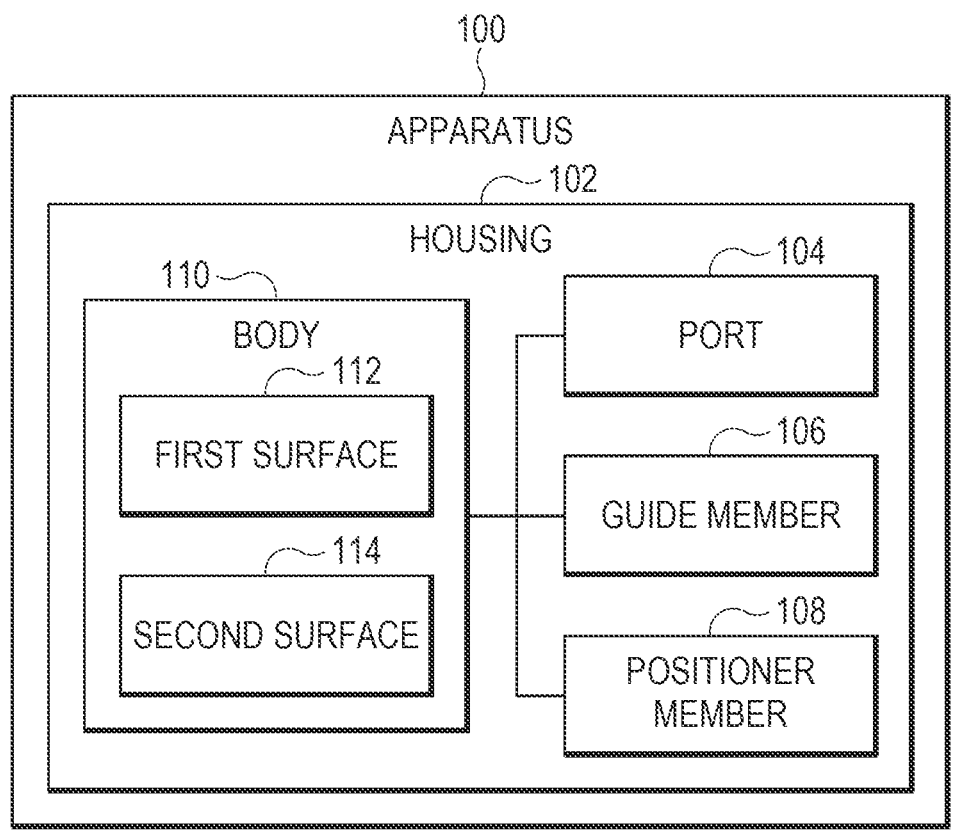
Figure 3:
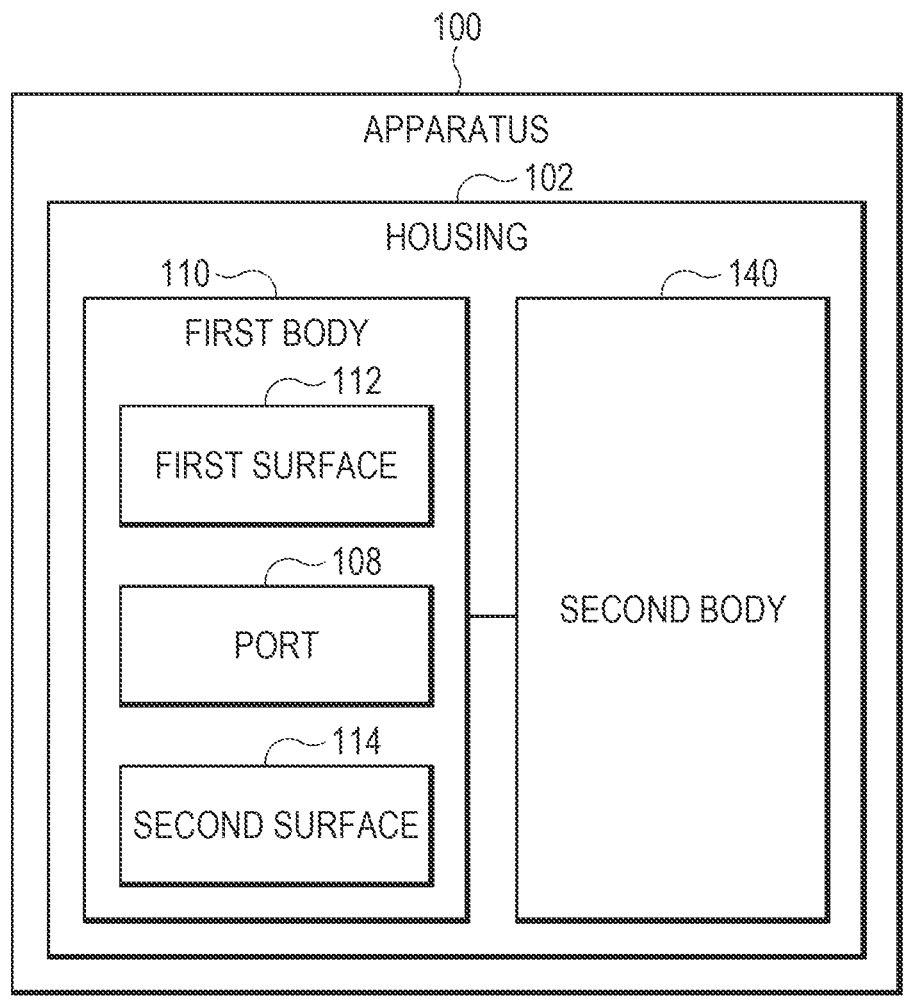

FIGS. 1-3 are block diagrams depicting example apparatus 100. Referring to FIG. 1, an example apparatus 100 generally includes a housing 102, a body 110, a port 104, and a guide member 106. In general, the guide member 106 is capable of orienting the body 110 to conceal the port 104 or reveal the port 104.

The housing 102 includes an exterior facing surface. A surface of the body 110 may be substantially flush with the exterior facing surface of the housing 102 when the body 110 is in a first orientation, such as a concealed orientation where the port 104 is concealed from external view. The housing 102 may be formed of an appropriate structural material and may enclose a number of electronics.

The port 104 may be concealed within the housing 102 when the body 110 is in the first position. The port 104 may be any appropriate port useable with an electronic device. For example, the port 104 may be an I/O port, a power port, or a network port. The port 104 may be coupled to the body 110.

The body 110 is a physical structure of the apparatus 100, and as such may be formed out of any appropriate structural material (e.g., plastic, metal, and the like.) The body 110 may include multiple parts. For example, the body 110 may include a first surface 112 and a second surface 114. In some examples, the first surface 112 and the second surface 114 are integrated in the same surface of a unitary body (e.g., a unitary cover over a USB port). In other examples, the first surface 112 may be located on a first body member and the second surface 114 may be located on a separate, second body member. The first surface 112 may be substantially parallel to (e.g., flush with) a surface of the housing when the body 110 is in a first position, and the second surface 114 may be substantially parallel to (e.g., flush with) a surface of the housing when the body 110 is in a first position.

The body 110 is moveable, such as rotatable. For example, the body 110 may rotate to reveal a port 104. The body 110 may move such that a first surface 112 of the body 110 may move to protrude from the housing 102 when the body 110 is in a second position and the second surface 114 of the body 110 may move to withdraw into the housing 102 when the body 110 is in the second position. The rotation may expose the port 104 at an angle with respect to the housing 102. For example, the port 104 may be oriented at an angle that is less than 45 degrees with respect to the surface of the housing 102 when the body is in an exposed orientation.

The body 110 may be made of the same material or different material than the material of the housing 102. The body 110 may include a visual indicator designating where to interact with the body or where the concealed USB port is located, for example.

The guide member 106 is coupled to the body 110. The guide member 106 is a physical structure that guides the body 110 to move between orientations. For example, the guide member 106 may guide the body to move between a first position to conceal the port 104 and a second position to reveal the port 104. The guide member 106 may guide surfaces of the body 110 to change position. For example, a first surface 112 of the body 110 may be guided by the guide member 106 to protrude from the housing 102 when the body 110 is in the second position, and a second surface 114 of the body 110 may be guided by the guide member 106 to withdraw into the housing when the body 110 is in the second position. The guide member 106 may be integrated into the body 110. In some examples, the guide member 106 may include multiple components.

The guide member 106 may rotate the body 110. For example, the apparatus may include a pivot about which the body 110 rotates and the guide member 106 may direct how the body 110 rotates about the pivot. In some examples, the guide member 106 acts as a cam. The axis of rotation about the pivot may be through the body in alignment with the guide member 106. For example, the guide member 106 may be centrally located and the pivot about which the body 110 rotates may be located in the center with respect to the body. In some examples, the guide member 106 may pivot based on the shape of the guide member 106 and pressure placed on the body 110. For example, the guide member 106 may include an over-center cam that follows a detent of a spring arm based on pressure placed on the body. In that example, sufficient pressure on the body 110 may flex the spring arm to allow the guide member 106 to rotate past the detent and may lock the body 110 into the first position (or the second position) depending on a location of the pressure placed on the body 110. In some examples, the pivot may be located off-center with respect to the body 110. The location of the pivot may affect the clearance of the port 104 from the housing and may reduce the effect of having a peripheral connection stick out by adjusting the position of rotation and amount of rotation to correspond with a desire angle (e.g., below a maximum angle with respect to the surface of the housing).

Referring to FIG. 2, the apparatus 100 of FIG. 2 may include the same components as the apparatus 100 of FIG. 1 as well as a positioner member 108. The position member 108 is a physical structure to bias the guide member 106 into a position. In general, the positioner member 108 is operatively coupled to the guide member 106 to induce the guide member 106 into a particular position (e.g., snap and/or lock into place), such as an exposed position or a concealed position. Example positioner members 108 may be a wall, a spring arm, a gear, a lip, a stopper, and the like, or a combination thereof. The positioner member 108 includes a detent to bias the guide member 106 into a first orientation or a second orientation. For example, the positioner member 108 may include a protrusion or indentation that induces a natural inclination into a first orientation corresponding to a first position of the body 110 or into a second orientation corresponding to a second position of the body 110. The positioner member 108 and the guide member 106 may work in conjunction to lock the body 110 into a single position of a plurality of positions. For example, the positioner member 108 may be a spring arm having a detent that interfaces with a corresponding detent shape of a surface of the guide member 106. In some examples, the positioner member 108 includes a plurality of detents to bias the guide member 106 into a plurality of positions corresponding to various degrees of orientation of the body 110. For example, a plurality of ports 104 (such as multiple USB ports) may be coupled to body 110 and each of the plurality of positions of the guide member 106 as defined by the plurality of detents may reveal an increasing number of USB ports based on the degree of orientation of the body 110. In this manner, the cover over the port area may have different amounts of rotation and/or offset movement from the surface of the housing and the ability to reveal additional ports in a supportive manner, such as by providing steps of detents along the positioner member to lock the body into each of the plurality of positions.

Referring to FIG. 3, the apparatus 100 may include a body composed of multiple body parts. The apparatus 100 of FIG. 3 includes a housing 102, a port 104, a first body member 110, and a second body member 140. The port 104 may be integrated into the first body member 110. For example, the first body member 110 may include a port area that is accessible on a surface 112 of the first body member 110 when the first body member 110 is in an exposed orientation and the port area surface is concealed when the first body member 110 is in a concealed orientation. The first body member 110 may include a first surface 112 and a face 132 that is perpendicular or oblique to the first surface 112. The first surface 112 of the first body member 110 may be substantially flush with the housing 102 when the first body member 110 is in a first orientation. The port 104 may be located on the face 132, hidden when the surface 112 is substantially flush with the surface of the housing 102.

A second body member 140 may be coupled to the first body member 110. The second body member 140 may rotate in conjunction with rotation of the first body member 110. For example, the second body member 140 may rotate to a withdrawn orientation to reveal a port 104 on the oblique or perpendicular, second face 132 of the first body member 110. In this manner, interaction with a portion of the body may cause action among the body members based on mechanical relationships corresponding to the manner in which the body members are coupled.

Figure 4:
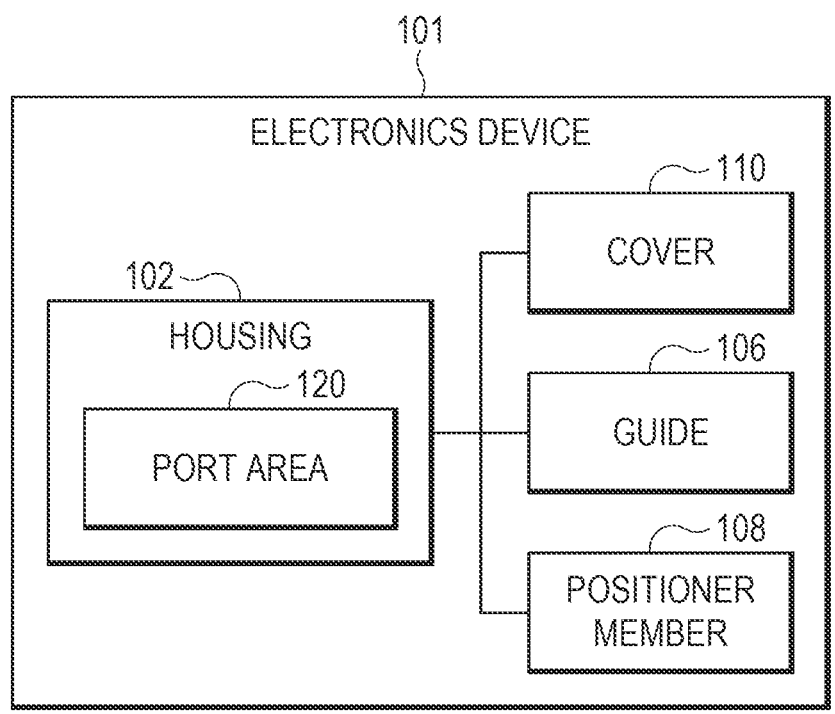
FIGS. 4-5 are block diagrams depicting example electronics devices.
Figure 5:
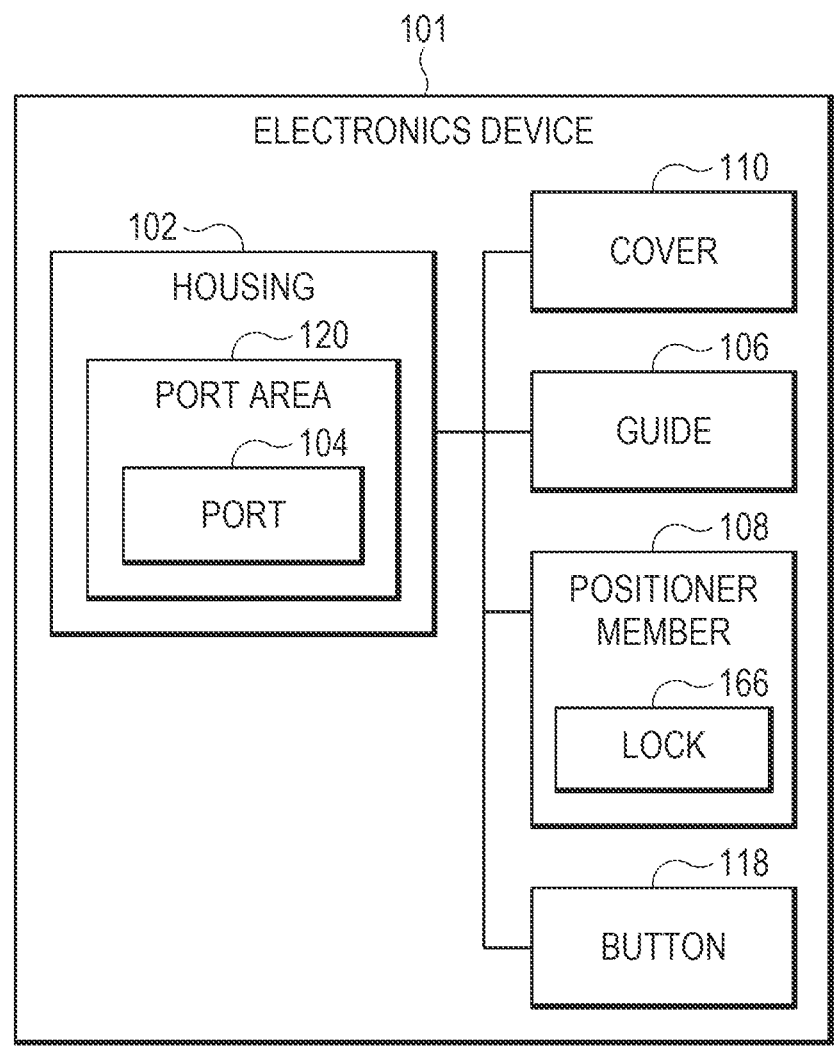

FIGS. 4-5 are block diagrams depicting example electronics devices 101. Referring to FIG. 4, the electronics device 101 generally includes a housing 102 with a port area 120, a cover 110, a guide 106, and a positioner member. The port area 120 is a section of an exterior-facing surface of the housing 102 where ports are expected to be located, such as based on visual indicators. The cover 110 is a physical structure, such as a body, to cover the port area 120 when the cover is in a concealed orientation. The cover 110 is moveable to an exposed orientation where the port area 120 is uncovered. The guide 106 is a physical structure that allows for rotation of the cover 110. For example, the guide 106 ushers the cover 110 to rotate into the uncovered orientation where at least part of the cover 110 withdraws into the housing 102 when the user places some force on the cover 110 and a USB port (shown as port 104 in FIG. 5) is revealed in the uncovered orientation. The port 104 may be integrated into the cover 110. The positioner member 108 is a physical structure that provides force to bias the cover 110 into a concealed orientation or an exposed orientation.

Referring to FIG. 5, the electronics device 101 of FIG. 5 may include the same components as the electronics device 101 of FIG. 4 as well as a button 118. The button 118 is a physical structure on the exterior of the housing 102. The button 118 may cause the cover 110 to rotate via the guide 106. The button 118 may be a component of the cover 110, such as surface 114 of FIG. 7A.

The positioner member 108 may be activated by the button 118. For example, the positioner member 108 may bias the cover 110 into the first orientation when the button 118 is inactive and bias the cover 110 into the second orientation when the button 118 is active.

The positioner member 108 may include a lock 166 that secures the cover 110 into a concealed orientation (e.g., even when force is applied properly to move the cover 110 into an exposed orientation), The lock mechanism 166 may be integrated into the cover 110, integrated into the housing 102, or may be a separate structure, such as spring-loaded tab insertable into the port 104. The housing 102 may include a structure corresponding to the lock 166. For example, the housing 102 may include a cavity into which a spring-loaded tab is inserted to restrict movement of the cover 110 and port 104. The lock 166 may have a bias independent of the bias provided by the guide 106 or may utilize the same bias effect of the guide 106 (e.g., move a guide member into an unlockable position maintained by a positioner member when a detent on the extremity of a spring arm is achieved). Example locks may be a tool lock or a spring-loaded lip lock.

The lock 166 may disable the cover 110 and/or guide 106. For example, the lock 166 may provide a force contrary to the button 118 to secure the cover 110 into the concealed position even when the button 118 is activated.

Figure 6A:
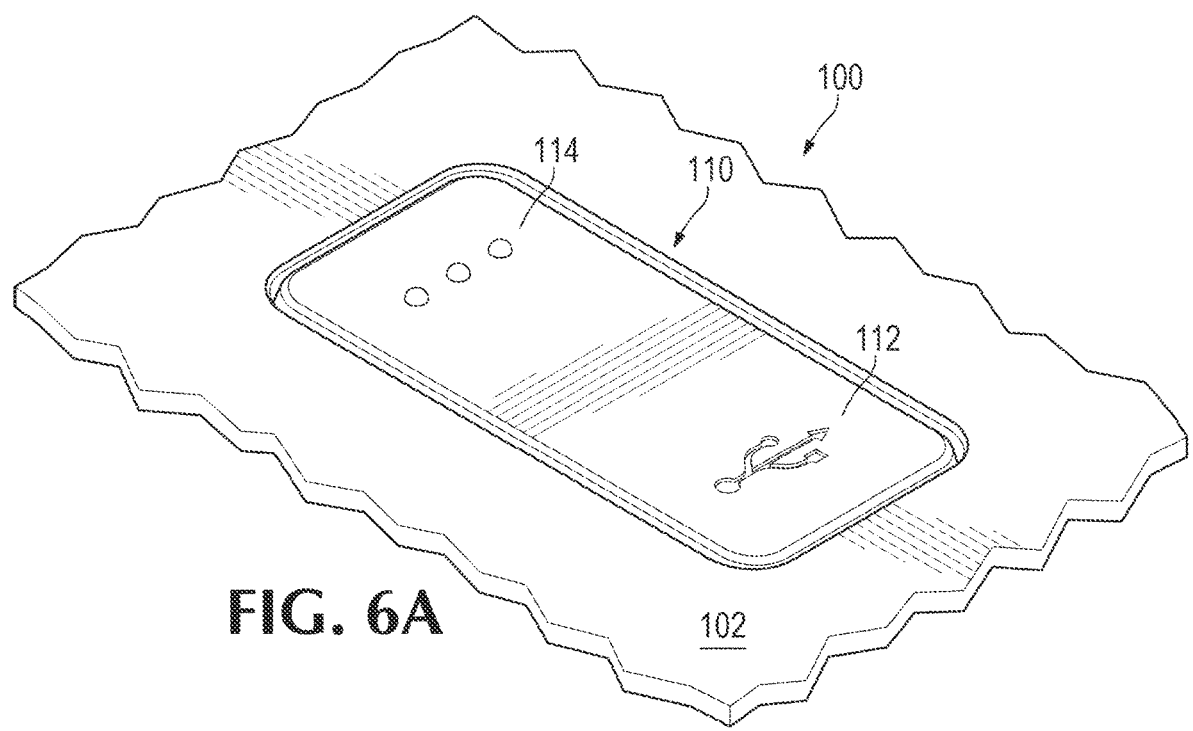
FIG. 6A is an isometric view of an example apparatus in an example concealed orientation.
Figure 6B:
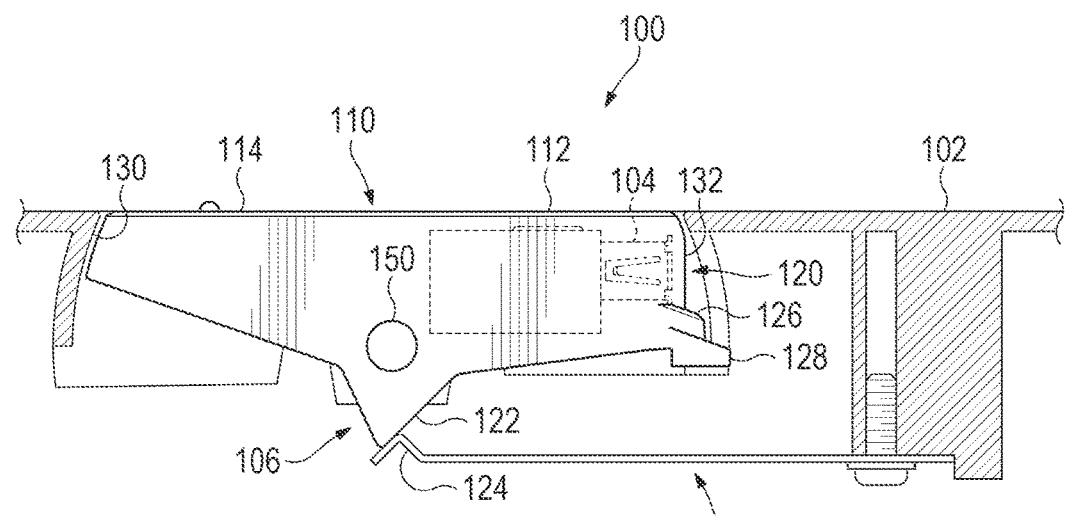
FIG. 6B is a sectional view of the example apparatus of FIG. 6A in the example concealed orientation of FIG. 6A.

FIG. 6A is an isometric view of an example apparatus 100 in an example concealed orientation. The surfaces 112 and 114 of the body 110 are about flush with the surface of the housing 102 where a port 104 is concealed within the housing 102 (e.g., the face 132, where the port area 120 is located, is facing into the housing 102. FIG. 6B is a sectional view of the example apparatus of FIG. 6A in the example concealed orientation of FIG. 6A. As depicted from the side in FIG. 6B, the body 110 generally resides in cavity defined by the wall 130. The guide member 106 includes a protrusion 122 that pushes against detent 124 of the spring arm 108, which acts as a positioner member as described herein. The body 110 may include a shroud 126 and/or lip 128 to assist positioning upon potential rotation of the body 110 around pivot 150.

Figure 6C:
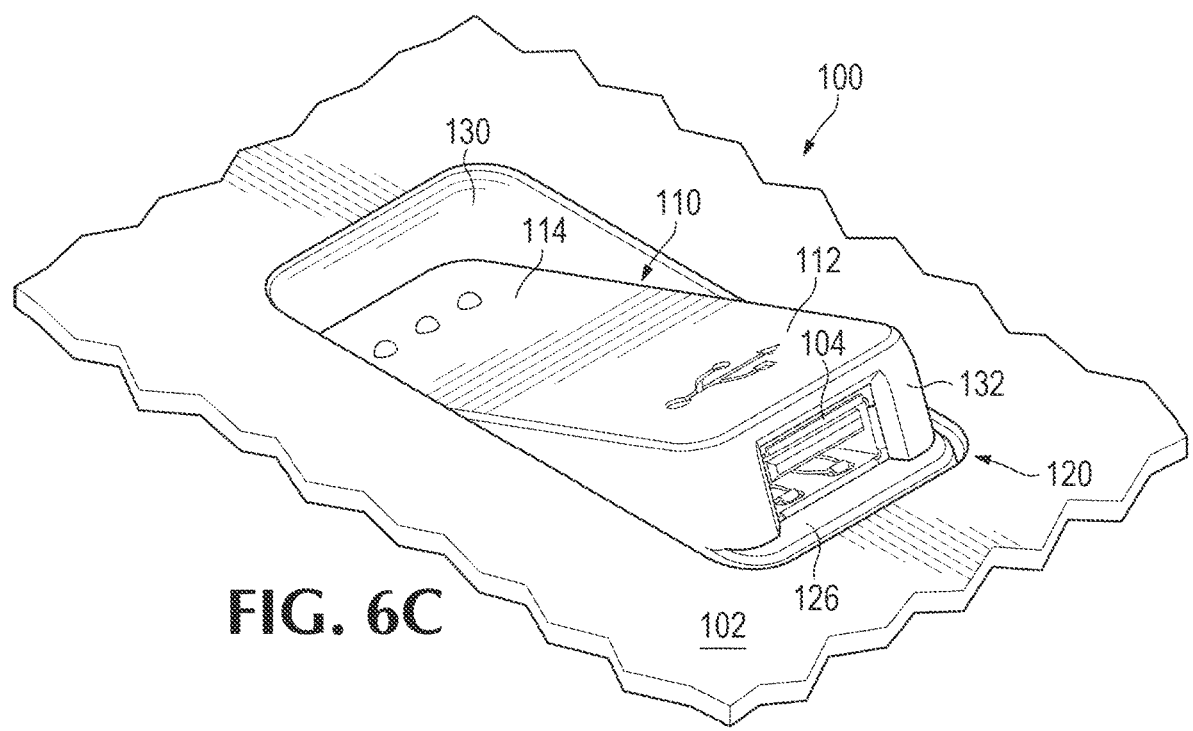
FIG. 6C is an isometric view of the example apparatus of FIG. 6A in an example exposed orientation.

FIG. 6C is an isometric view of the example apparatus 100 of FIG. 6A in an example exposed orientation. The surface 114 of the body 110 withdraws into the cavity of the housing 102 and the surface 112 moves to protrude farther away from the surface of the housing 102, and in this orientation, the port area 120 is exposed on the exterior of the housing and the port 104 is accessible for use.

Figure 6D:
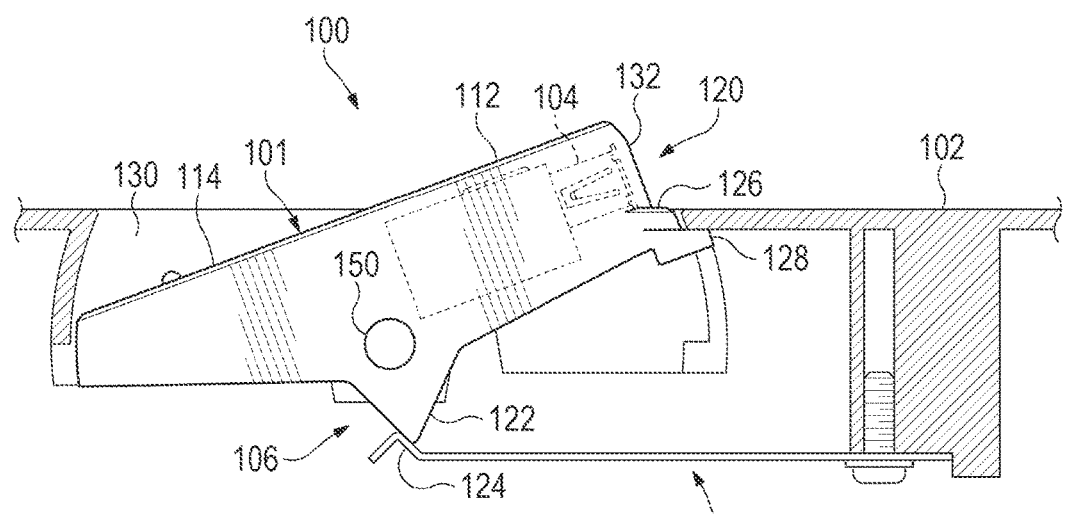
FIG. 6D is a sectional view of the example apparatus of FIG. 6A in the example exposed orientation of FIG. 6C.

FIG. 6D is a sectional view of the example apparatus of FIG. 6A in the example exposed orientation of FIG. 6C. The apparatus 100 may result in the depicted orientation when force is placed on the surface 114, which generates a rotational force around a pivot 150 to move the protrusion 122 of the guide member 106 over the detent 124 based on the flexibility of the spring arm 108. The detent 124 pushes back on the protrusion 122 to maintain the body 110 in the exposed orientation with access to the port 104 on the face 132. A lip 128 may contact the housing 102 or some other stop to limit rotation of the body 110. The body 110 may include a shroud 126 as a feature to hinder dust, dirt, or other objects from entering the cavity defined by wall 130. In some examples, the shroud surrounds the unitary cover (e.g., the top surface of the body 110) to contact walls of a cavity into which part of the cover withdraws (e.g., surface 114 is withdrawn into the cavity in the example of FIG. 6D.

Figure 6E:
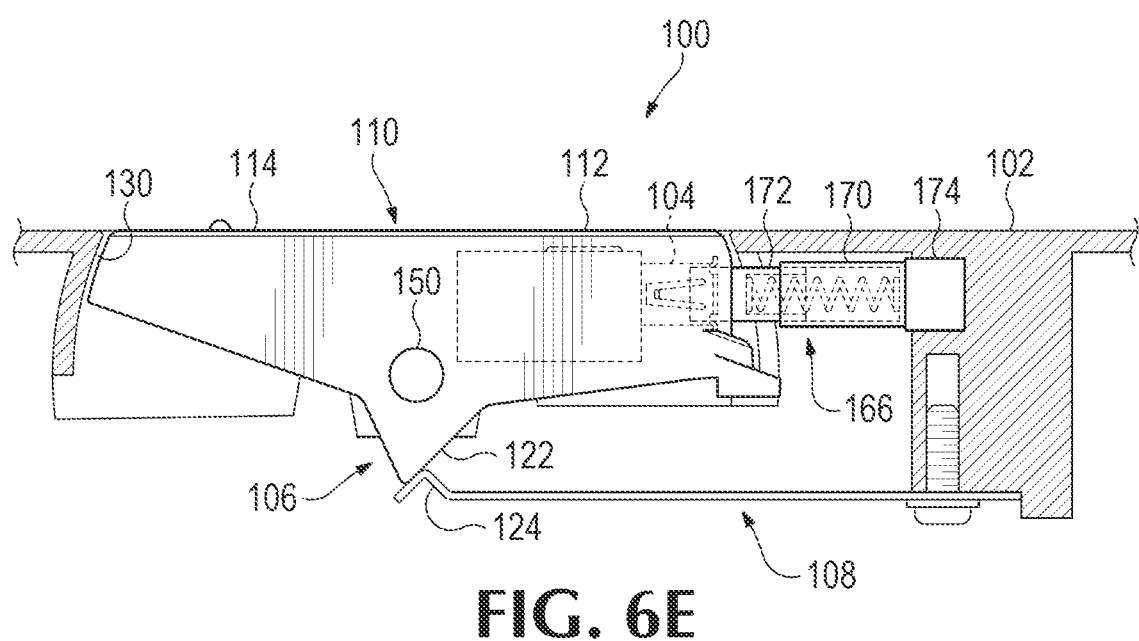
FIG. 6E is a sectional view of an example apparatus of FIG. 6A in the example concealed orientation.

FIG. 6E is a sectional view of an example apparatus of FIG. 6A in the example concealed orientation of FIG. 6A. The apparatus 100 may include a lock 166 to maintain the body 110 in a concealed position even when proper force is applied to rotate the guide member 106 over the detent 124 without the lock 166 being active. The lock 166 may include an actuator and a stopper. For example, the housing 102 may include a recess where a controller 174 and a spring-loaded stopper 170 reside. A controller, as used herein, represents a processor resource and a memory resource having a control program stored thereon to cause the controller to operate the stopper 170 according to the control program when the processor executes the control program. When the controller 174 is activated, the controller 174 actuates the spring-loaded stopper 170 to project an extension 172 towards the face 132, such as into the port 104, to lodge the port 104 into a concealed position. Pressure placed on surface 114 may not generate sufficient rotational force to overcome the detent 124 because such force may be transferred into the stopper 170 of the lock 166 via the extension 172. In another example, the first body member 110 may include a spring-loaded mechanical tab inserted into the port that extends into a cavity into the housing when the body member is moved into a concealed orientation. In some examples, the spring-loaded stopper 170 may be integrated into the body 110. In some examples, the body member 110 may be locked into place by a fastener concealed under a case of the electronic device.

Figure 7A:
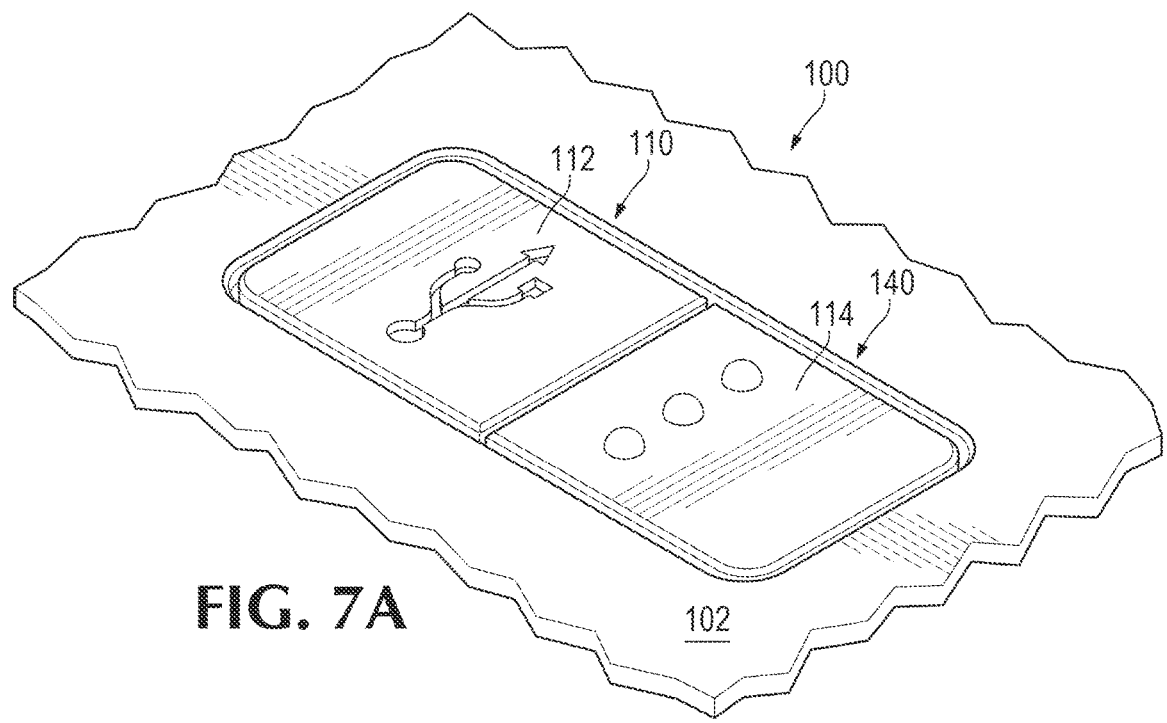
FIG. 7A is an isometric view of an example apparatus in an example concealed orientation.

FIG. 7A is an isometric view of an example apparatus 100 in an example concealed orientation. The example apparatus 100 includes two body members 110 and 140. When in the concealed orientation, the surface 112 of the body member 110 is substantially flush with (e.g., at the same height as) the surface 114 of the body member 140. The alignment of the surfaces 112 and 114 may also align with the surface of the housing 102.

Figure 7B:
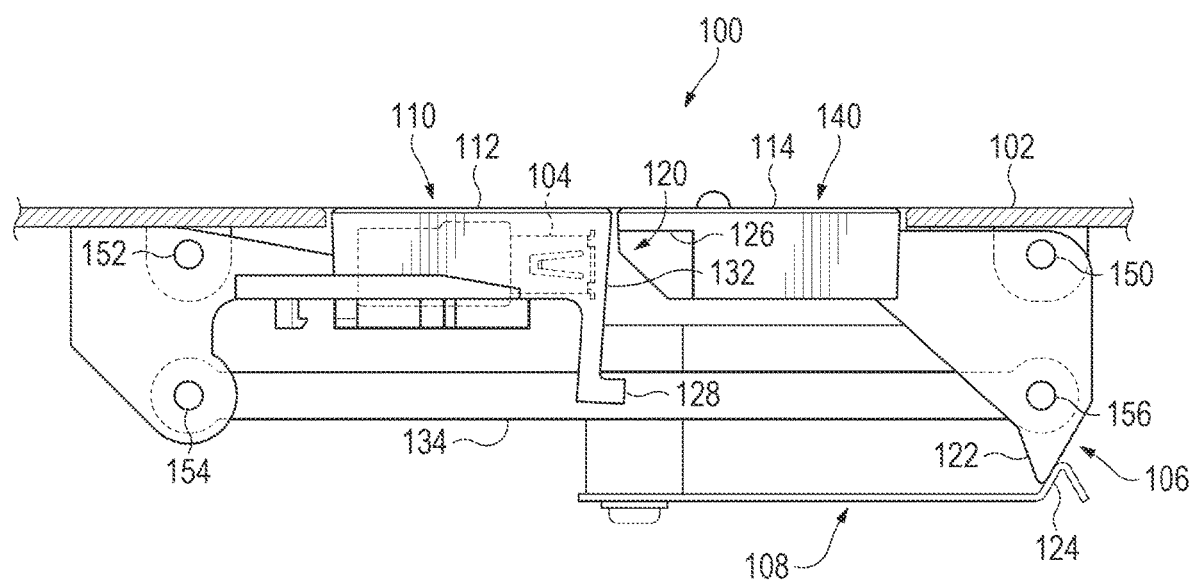
FIG. 7B is a sectional view of the example apparatus of FIG. 7A in the example concealed orientation of FIG. 7A.

FIG. 7B is a sectional view of the example apparatus 100 of FIG. 7A in the example concealed orientation of FIG. 7A. The body members 110 and 140 are coupled together via a multi-bar linkage. The multi-bar linkage includes a first pivot 152 coupled to the housing 102 and a second pivot 150 coupled to the housing 102. The body member 110 rotates about the pivot 152, and the body member 140 rotates about the pivot 150. A bar 134 couples the body member 110 and the body member 140 in the example of FIG. 7B. Thus, a movement, such as a rotation, of the body member 140 may induce rotation of the body member 110 and vice versa. In this manner, the first body member 110 is a first link of the multi-bar linkage that rotates about a first pivot 152 coupled to the housing 102, the second body member 140 is a second link of the multi-bar linkage that rotates about a second pivot 150 coupled to the housing, the bar 134 is a third link of the multi-bar linkage, and the housing is an anchoring fourth link of the multi-bar linkage. The guide member 106 is offset from the pivot 150 and includes a protrusion 122 to interface with the detent 124 of the spring arm 124. Similar to that of FIG. 6B, the spring arm 108 sustains the guide member 106 in a concealed position until sufficient pressure flexes the spring arm 108 to pass the protrusion 122 over the detent 124.

Figure 7C:
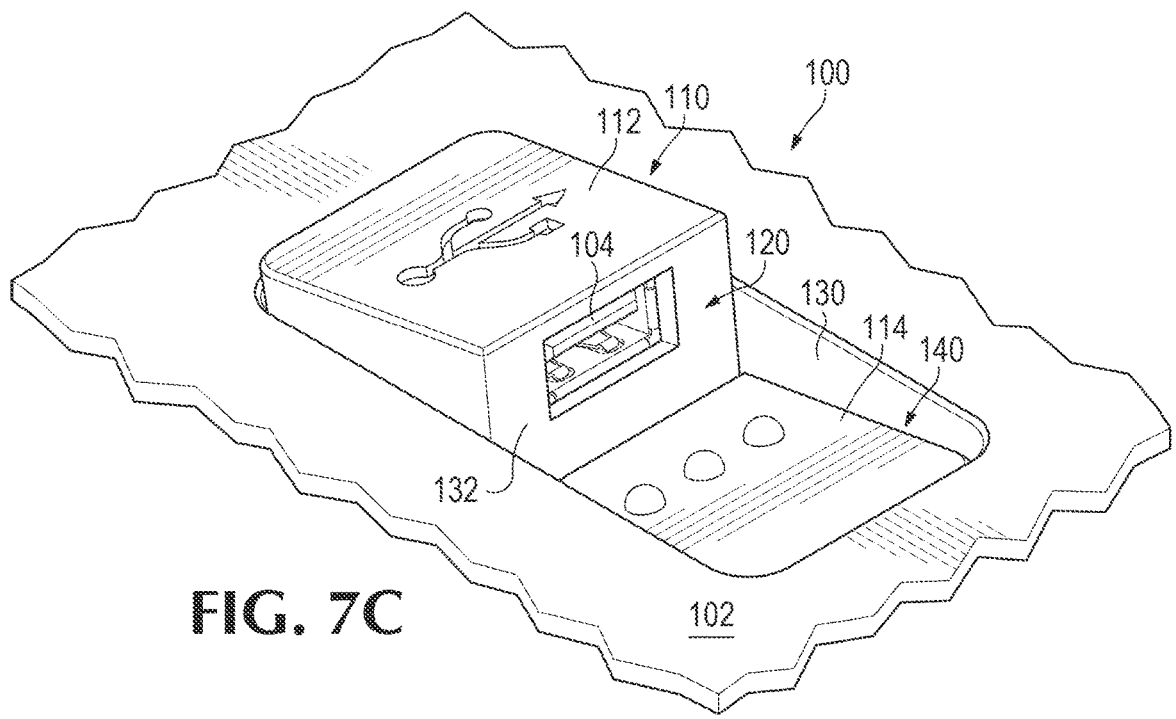
FIG. 7C is an isometric view of the example apparatus of FIG. 7A in an example exposed orientation.
Figure 7D:
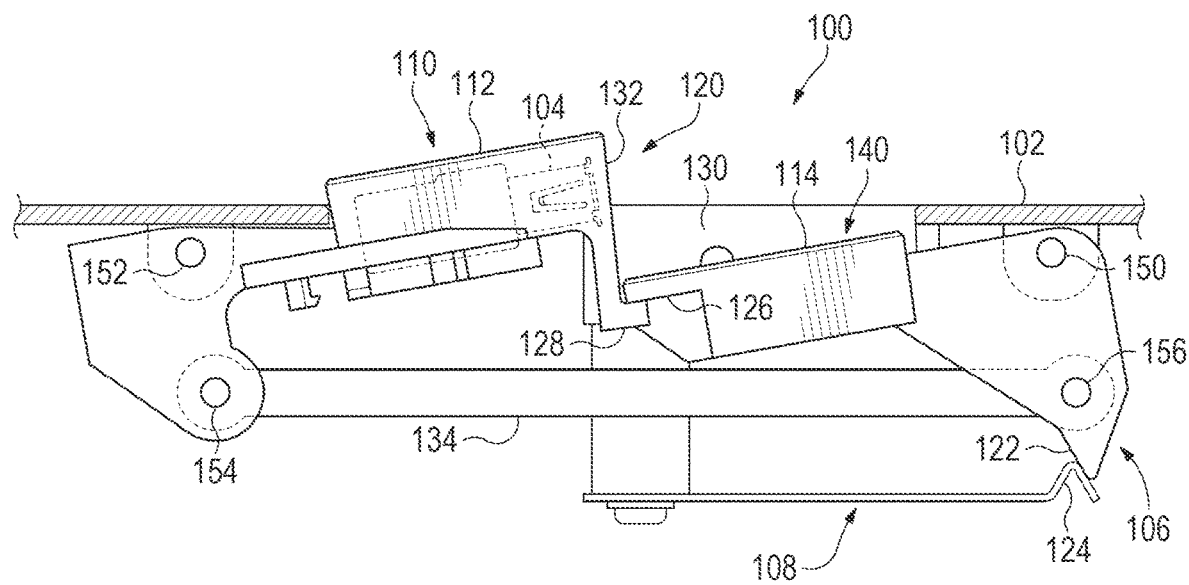
FIG. 7D is a sectional view of the example apparatus of FIG. 7A in the example exposed orientation of FIG. 7C.

FIG. 7C is an isometric view of the example apparatus 100 of FIG. 7A in an example exposed orientation. The apparatus 100 may be placed in the exposed orientation when sufficient pressure flexes the spring arm 108 to allow the guide member 106 to rotate past the detent 124 and then the detent 124 of the spring arm 108 sustains the guide member 106 until sufficient pressure flexes the spring arm 106 again. In the example of FIGS. 7C and 7D, the apparatus 100 includes a first body member 110 protruding above the surface of the housing 102 and a second body member 140 recessed into a cavity of the housing 102 defined by wall 130. This orientation of the body members 110 and 140 exposes the port 104 at the port area 120.

FIG. 7D is a sectional view of the example apparatus 100 of FIG. 7A in the example exposed orientation of FIG. 70. Pressure on the surface 114 rotates the body member 140 about the pivot 150, and with sufficient pressure, the guide member 106 moves past the detent 124 and the pivot 156 pulls bar 134 as well as pivot 154. The movement of pivot 154 rotates the first body member 110 about the pivot 152 in the opposing rotational direction of second body member 140. In this manner, the surface 112 appears to move away from the housing 102 while the surface 114 appears to move into the housing 102 and expose the face 132 where the port 104 resides. The rotation of the body members 110 and 140 may continue until the lip 128 of the first body member 110 contacts the lip 126 of the second body member 140. The lip 126 and/or the lip 128 may move with reference to each other to act as a shroud and protect dust or dirt from entering the cavity defined by wall 130. The body members 110 and 140 may return to their concealed orientations when sufficient pressure (e.g., to overcome the detent 124) is placed on the surface 112 and the bar 134 pushes the guide member 106 and the body member 140 into the concealed position. In this manner, a user may be able to switch the apparatus 100 between concealing the port 104 and revealing the port 104 based on the location of pressure placed on the apparatus 100 (e.g., pressure on the surface 112 or the surface 114).

FIG. 8A is a sectional view of an example apparatus 100 in an example concealed orientation. The apparatus 100 of FIG. 8A may appear externally the same as shown with respect to apparatus 100 of FIG. 7A. The body members 110 and 140 of FIG. 8A are coupled via a pinion 160. The pinion 160 may be coupled to the body members 110 and 140 such that movement of one body member induces movement of the other body member via the pinion (e.g., rotation of the pinion moves both body members).

FIG. 8B is a sectional view of the example apparatus 100 of FIG. 8A in an example exposed orientation. The apparatus 100 of FIG. 8B may appear externally the same as shown with respect to apparatus 100 of FIG. 7C. The teeth of the pinion 160 interlock with teeth 162 of the body member 140 and the teeth 164 of the body member 110. This allows for the body member 110 and 140 to move in conjunction with each other. For example, the body member 140 rotates about the pivot 150 and teeth 162 rotate the teeth of the pinion 160 which, in turn, move the teeth 164 in the same rotational direction and induces the body member 110 to rotate about the pivot 152 to expose the port 104 at the port area 120.

The lip 126 protrudes from body member 140 and the lip 128 protrudes from the body member 110. The lip 126 and lip 128 may rotate towards each other to reveal the port 104 and away from each other to conceal the port 104. Lips 126 and 128 rotate towards each other or away from each other depending on the pressure placed on the surfaces of the body member 110 and 140. Lips 126 and 128 may act as a stopper to prevent over-rotation and may act as a shroud to protect the cavity of the housing 102. The body member 110, the body member 140, and/or the pinion 160 may have equal or differing size properties. For example, the teeth of the body member 110 may be spaced or sized different to the gear ratio of the teeth of the body member 140, In other examples, the size or spacing of the teeth of the pinion 160 may vary along the perimeter. In yet other examples, the shape of the pinion 160 may be oval or irregular to induce different distances of movement between the body member 110 and the body member 140. The gear ratio between the pinion 160 and the first body member 110 may be equal or different to the gear ratio between the pinion 160 and the second body member 140. Such variations may allow for particular angles of the port 104 and/or more or less space to be provided for exposure to the port 104. In this manner, an electronics device may provide clean industrial design when a port is not in use and a smaller foot print capable of providing port capabilities as desired by a user of the electronics device.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. An apparatus comprising:
   a housing;
   a body moveable relative to the housing, the body including:
      a first surface substantially parallel to a surface of the housing when the body is in a first position; and
      a second surface substantially parallel to the surface of the housing when the body is in the first position;
   a port coupled to the body, the port concealed within the housing when the body is in the first position;
   a guide member coupled to the body, the guide member to guide the body to move between the first position and a second position to reveal the port, the first surface to protrude from the housing when the body is in the second position and the second surface which rotates to withdraw into the housing when the body is in the second position; and
   a positioner member coupled to the guide member, the positioner member having a detent to bias the guide member into a first orientation corresponding to the first position of the body or a second orientation corresponding to the second position of the body.

2. The apparatus of claim 1, comprising:
a pivot about which rotates the body,
wherein:
an axis of rotation about the pivot is through the body aligned with the guide member; and
the first surface of the body and the second surface of the body are portions of a unitary cover.

3. The apparatus of claim 2, wherein:
the pivot is located in the center with respect to the body; and
the port is oriented at an angle that is less than 45 degrees with respect to the surface of the housing when the body is in the second position.

4. The apparatus of claim 2, comprising:
a shroud around the unitary cover to contact walls of a cavity into which the second surface withdraws.

5. The apparatus of claim 1, wherein:
the positioner member is a spring arm, the spring arm having the detent that interfaces with a corresponding detent shape of a surface of the guide member; and
the guide member includes an over-center cam that follows the detent based on pressure placed on the body, such that sufficient pressure to flex the spring arm allows the guide member to rotate past the detent and lock the body into the first position or the second position depending on a location of the pressure placed on the body.

6. The apparatus of claim 1, wherein:
the positioner member includes a plurality of detents, the plurality of detents to bias the guide member into a plurality of positions corresponding to various degrees of orientation of the body.

7. The apparatus of claim 6, comprising:
a plurality of universal serial bus (USB) ports, each of the plurality of USB ports revealable based on a degree of orientation of the body member as guided by each of the plurality of positions of the guide member defined by the plurality of detents.

8. An apparatus comprising:
a housing;
a first body member having:
a first surface that is substantially flush with the housing when the first body member is in a first orientation; and
a second surface that is oblique or perpendicular to the first surface;
a port integrated into the first body member and accessible on the second surface of the first body member; and
a second body member coupled to the first body member, the second body member to rotate in conjunction with rotation of the first body member, the second body member to rotate to a second orientation to reveal the port on the second surface of the first body member.

9. The apparatus of claim 8, comprising:
a multi-bar linkage comprising:
a bar connecting the first body member and the second body member, wherein:
the first body member is a first link of the multi-bar linkage that rotates about a first pivot coupled to the housing;
the second body member is a second link of the multi-bar linkage that rotates about a second pivot coupled to the housing; and
the bar is a third link of the multi-bar linkage.

10. The apparatus of claim 8, comprising:
a pinion coupled to the first body member and the second body member, such that movement of the first body member induces movement of the second body member via the pinion;
a first lip protruding from the first body member; and
a second lip protruding from the second body member, the first lip and second lip to rotate towards each other to reveal the port and away from each other to conceal the port.

11. The apparatus of claim 10, wherein:
the pinion, the first body member, and the second body member have teeth, where a gear ratio between the pinion to the first body member is different to the gear ratio between the pinion to the second body member.

12. An electronics device, comprising:
a first body member that includes a housing defining a port area; and
a cover coupled to the first body member to cover the port area when in a first orientation;
a second body member coupled to the first body member, the second body member to rotate in conjunction with rotation of the first body member, the second body member to rotate to a second orientation to reveal the port area of the first body member;
a guide to allow for rotation of the cover, the cover to rotate into a second orientation to reveal the port area such that at least part of the cover withdraws into the housing; and
a positioner member coupled to the guide, the positioner member having a detent to bias the guide into the first orientation or the second orientation.

13. The electronics device of claim 12, comprising:
a button to rotate the cover via the guide; and
a port integrated in the cover, the port being an input/output port,
wherein the positioner member biases the cover into the first orientation when the button is inactive and the positioner member biases the cover into the second orientation when the button is active.

14. The electronics device of claim 13, wherein:
the positioner member includes a lock that secures the cover into the first orientation even when the button is activated.

* * * * *